United States Patent [19]

Piltch

[11] Patent Number: 5,367,141
[45] Date of Patent: Nov. 22, 1994

[54] PHOTOCHEMICAL CUTTING OF FABRICS

[75] Inventor: Martin S. Piltch, Los Alamos, N. Mex.

[73] Assignee: The United States of America as represented by the United States Department of Energy, Washington, D.C.

[21] Appl. No.: 38,203

[22] Filed: Mar. 26, 1993

[51] Int. Cl.⁵ ............................................. B23K 26/00
[52] U.S. Cl. ........................... 219/121.67; 219/121.72
[58] Field of Search ..................... 219/121.67, 121.72, 219/121.73

[56] References Cited

U.S. PATENT DOCUMENTS

| | | | |
|---|---|---|---|
| 4,002,877 | 1/1977 | Banas | 219/121.72 |
| 4,879,451 | 11/1989 | Gart | 219/121.69 |
| 4,908,494 | 3/1990 | Faiz et al. | 219/121.72 |
| 5,257,706 | 11/1993 | McIntyre | 219/121.69 |

Primary Examiner—C. L. Albritton
Attorney, Agent, or Firm—Milton D. Wyrick; William A. Eklund; William R. Moser

[57] ABSTRACT

Apparatus for the cutting of garment patterns from one or more layers of fabric. A laser capable of producing laser light at an ultraviolet wavelength is utilized to shine light through a pattern, such as a holographic phase filter, and through a lens onto the one or more layers of fabric. The ultraviolet laser light causes rapid photochemical decomposition of the one or more layers of fabric, but only along the pattern. The balance of the fabric of the one or more layers of fabric is undamaged.

9 Claims, 1 Drawing Sheet

PHOTOCHEMICAL CUTTING OF FABRICS

BACKGROUND OF THE INVENTION

The present invention generally relates to the cutting of fabric, and, more specifically, to the use of ultraviolet light to cut fabrics through photochemical decomposition. The invention is a result of a contract with the Department of Energy (Contract No. W-7405-ENG-36).

The international garment industry has, as one of its chief endeavors, the time consuming and expensive process of cutting the pattern of the piece of clothing from many layers of material. In the recent past, this was accomplished with large reciprocating knives, which cut a pattern, under either digital or manual control, through many layers of cloth.

More recently, lasers have been utilized as thermal sources to actually burn through the fibers of the cloth. When focussed to very fine spots, the lasers can burn through many layers of cloth. Very fine cuts, with high precision are possible with the cloth on a numerically controlled positioning table. However, although the laser-cutting method is faster than the knife-cutting method of the past, it still suffers from the time delay inherent in having to trace around a pattern, and the complexity and expense of numerical controls.

A large segment of the population is familiar with the effect of ultraviolet light from the sun deteriorating automobile upholstery. This action occurs even though some of the ultraviolet light is intercepted by the automobile glass. To produce this deterioration, the ultraviolet light photochemically interacts with the textile fibers, changing their chemical and physical properties. The more obvious effect is the bleaching of the fabric due to the interaction of the ultraviolet solar photons with the dyes used to color the fabric. The more deleterious effect is the eventual shredding of the fabric due to loss of the mechanical strength of the fabric.

The present invention uses this photochemical effect of solar ultraviolet radiation to present an improved method for cutting fabrics. It accomplishes this by use of laser radiation shone through pathways in a pattern, such as a holographic phase filter, to cut through multiple layers of material, with the entire pattern cut simultaneously.

It is therefore an object of the present invention to provide apparatus for the cutting of fabric which can cut at the same time an entire pattern from a piece of fabric.

It is another object of the present invention to provide apparatus for the cutting of patterns from fabric which does not require numerical control.

It is still another object of the present invention to provide apparatus for the cutting of various sized patterns from multiple layers of fabric utilizing a laser shining ultraviolet light through a holographic phase filter.

Additional objects, advantages and novel features of the invention will be set forth in part in the description which follows, and in part will become apparent to those skilled in the art upon examination of the following or may be learned by practice of the invention. The objects and advantages of the invention may be realized and attained by means of the instrumentalities and combinations particularly pointed out in the appended claims.

SUMMARY OF THE INVENTION

To achieve the foregoing and other objects, and in accordance with the purposes of the present invention, as embodied and broadly described herein, the apparatus of this invention comprises a laser capable of producing ultraviolet light in optical communication with pattern means, the pattern means defining pathways for the laser light in the shape of the garment pattern. Lens means receive the laser light in the shape of the garment pattern and focusses the laser light onto the one or more layers of fabric. As a result, photochemical decomposition cuts the one or more layers of fabric in the shape of the garment pattern.

In a further aspect of the present invention, and in accordance with its objects and purposes, a method of cutting garment patterns from one or more layers of fabric comprises the steps of shining ultraviolet light through a pathway defining the garment pattern; focussing the ultraviolet light shined through the channel defining the garment pattern onto the one or more layers of fabric; wherein the garment pattern is cut into the one or more layers of fabric by photochemical decomposition.

BRIEF DESCRIPTION OF THE DRAWINGS

The accompanying drawing, which is incorporated in and forms a part of the specification, illustrates the embodiments of the present invention and, together with the description, serves to explain the principles of the invention. In the drawing.

DETAILED DESCRIPTION

Figure 1:
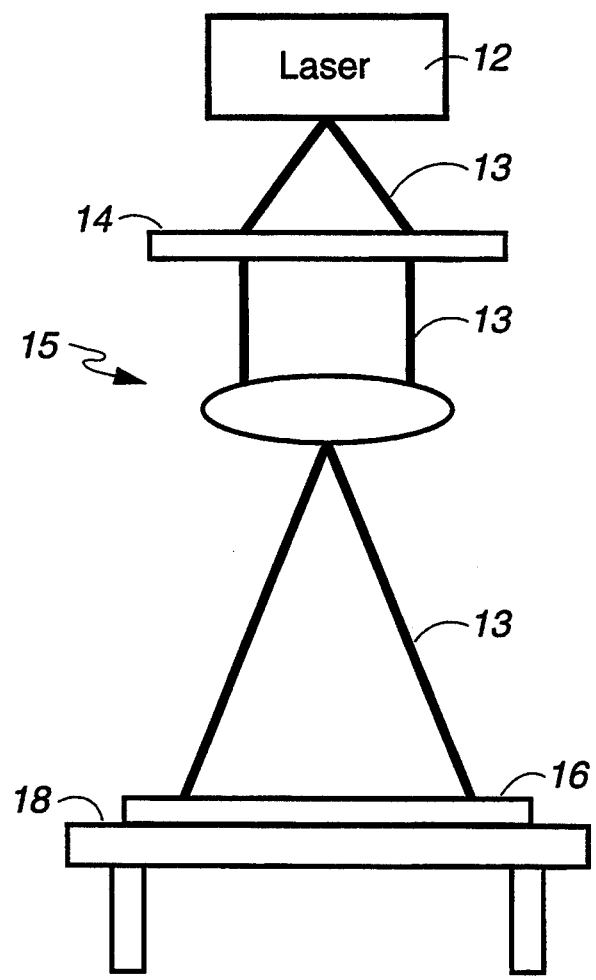
FIG. 1 is an schematical illustration of one embodiment of the present invention.

The present invention provides apparatus for the cutting of multiple layers of fabric simultaneously into clothing patterns by the use of focussed ultraviolet light. The invention will be most readily understood through reference to the drawings. In FIG. 1, a schematical plan view of one embodiment of the invention is illustrated. Here, laser 12 is shown located over pattern 14, with light 13 from laser 12 shining through pathways in pattern 14 and into lens 15. Lens 15 focusses light 13 in the shape of pattern 14 onto one or more fabric layers 16.

Light 13, in the desired shape of pattern 14, is focussed onto one or more fabric layers 16 for approximately 1 sec. One or more fabric layers 16 reside on table 18 which is positioned to maintain one or more fabric layers 16 in a specific focal plane of lens 15. Light 13, not impeded by any window material as in the case of solar radiation in an automobile, and of far greater photon energy than that appearing in the solar spectrum, causes rapid photochemical decomposition of one or more fabric layers 16 only where it has been exposed to the intense ultraviolet radiation of light 13.

The image of pattern 14, now cut from one or more fabric layers 16, is then separated from the remaining portions of one or more fabric layers 16, and is transferred to a sewing area for completion of the final garment. Light 13 from laser 12 will not damage any other areas of one or more fabric layers 16 because it has been focussed to a fine line in the shape of pattern 14.

Laser 12 would typically be a noble gas excimer laser, such as a XeCl laser operating at a wavelength of 308 nm, or a KrF laser operating at a wavelength of 248 nm. In the future, diode pumped solid state lasers operating at a wavelength of 354 nm, or a wavelength of 265 nm, using the harmonics of Nd lasers, will become commercially available. When using such powerful, efficient ultraviolet lasers as laser 12, the exposure time of light 13 could be reduced into the millisecond range.

However, either type of laser 12 will cut pattern 14 into fabric layers 16 far faster than with conventional knife-cutting or laser burning techniques. This results from the fact that the present invention exposes the entire pattern 14 onto fabric layers 16, rather than tracing around a pattern, as is done with conventional cutting or burning techniques.

Pattern 14 can be constructed of any material which will effectively allow ultraviolet light from laser 12 to shine through pathways in the precise pattern desired to be cut into fabric layers 16. In one embodiment, pattern 14 can be a holographic phase filter. Holographic phase filters are well-known devices which allow the present invention to provide selectable sized patterns through adjustment of the focus of lens 15. Dentents could be employed with lens 15 to set it precisely for the various standard clothing sizes.

The foregoing description of the preferred embodiments of the invention have been presented for purposes of illustration and description. It is not intended to be exhaustive or to limit the invention to the precise form disclosed, and obviously many modifications and variations are possible in light of the above teaching. The embodiments were chosen and described in order to best explain the principles of the invention and its practical application to thereby enable others skilled in the art to best utilize the invention in various embodiments and with various modifications as are suited to the particular use contemplated. It is intended that the scope of the invention be defined by the claims appended hereto.

What is claimed is:

1. Apparatus for cutting a garment pattern from one or more layers of fabric comprising:
   a laser capable of producing ultraviolet light;
   pattern means in optical communication with said laser light, said pattern means defining pathways for said laser light in the shape of said garment pattern;
   lens means receiving said laser light in the shape of said garment pattern for focussing said laser light onto said one or more layers of fabric.

2. The apparatus as described in claim 1 wherein said laser comprises a noble gas excimer laser.

3. The apparatus as described in claim 2 wherein said noble gas excimer laser comprises a XeCl laser.

4. The apparatus as described in claim 3 wherein said XeCl laser produces said laser light at a wavelength of 308 nm.

5. The apparatus as described in claim 2 wherein said noble gas excimer laser comprises a KrF laser.

6. The apparatus as described in claim 5 wherein said KrF laser produces said laser light at a wavelength of 248 nm.

7. The apparatus as described in claim 1, further comprising table means for supporting said one or more layers of fabric at a focal plane of said lens means.

8. The apparatus as described in claim 1 wherein said pattern means comprises a holographic phase filter.

9. A method of cutting garment patterns from one or more layers of fabric comprising the steps of:
   shining ultraviolet light through a pathway defining said garment pattern;
   focussing said ultraviolet light shined through said pathway defining said garment pattern onto said one or more layers of fabric;
   wherein said garment pattern is cut into said one or more layers of fabric by photochemical decomposition.

* * * * *